United States Patent Office 3,417,062
Patented Dec. 17, 1968

3,417,062
2-ALKENYL-1,3-DIOXOLENIUM AND 1,3-DIOX-ENIUM SALTS AND POLYMERS THEREOF
Donald A. Tomalia, Midland, Mich., assignor to The Dow Chemical Company, Midland, Mich., a corporation of Delaware
No Drawing. Filed July 11, 1966, Ser. No. 564,044
9 Claims. (Cl. 260—79.3)

This invention concerns new 2-alkenyl-1-1,3-dioxolenium and 1,3-dioxenium salts and polymers containing pendent 1,3-dioxolenium or 1,3dioxenium groups. It also pertains to the preparation of these monomers and polymers from readily available acrylic esters.

Several methods for the preparation of 2-alkyl- or 2-aryl-1,3-dioxolenium and 1,3-dioxenium salts are described by Meerwein et al., in Angew. Chem., 69, 481 (1957) and Ann., 632, 38 (1960). Thus 2-methyl-1,3-dioxolenuim tetrafluoroborate can be prepared by reacting $\beta$-bromoethyl acetate with anhydrous silver tetrafluoroborate in methylene chloride. Alternately a $\beta$-hydroxy or $\beta$-alkoxyalkyl ester of a saturated aliphatic acid can by cyclized with antimony pentachloride in a non-aqueous medium. Recently an improved process for the cyclization of a $\beta$- or $\gamma$-hydroxy- or alkoxyalkyl ester has ben found employing certain strong acids such as sulfuric and fluorosulfuric acid.

It has now been discovered that a new and useful class of ethylenically unsaturated monomers of Formula I:

wherein B is H, Cl or a $C_1$–$C_4$ alkyl group, each R individually is H or a $C_1$–$C_4$ alkyl group, a is 1 or 2 and Z is an anion selected from the group consisting of perchlorate, chlorate, bisulfate, fluorsulfate, tetrafluoroborate and hexafluoroantimonate, can be prepared. Also it has been discovered that these ethylenically unsaturated monomers can be polymerized to yield useful polymers and copolymers containing pendent 1,3-diovolenium (II, $a=1$) or 1,3-dioxenium (II, $a=2$) groups as shown in Formula II:

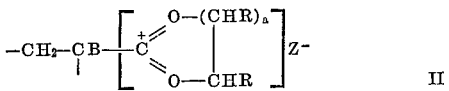

wherein R, a, and Z are defined as above. Furthermore it has been found that these and other new polymers with pendent 1,3-diolenium or 1,3-dioxenium groups as shown in Formula III:

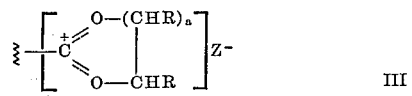

can also be prepared from polymers containing pendant $\beta$- or $\gamma$-halo-, hydroxy- or alkoxyalkyl ester groups.

These new 1,3-dioxolenium and 1,3-dioxenium monomers and polymers can usually be isolated in a crystalline form, stable at room temperature in the absence of water. Because they react rapidly with a variety of nucleophilic reagents to open the ring and form useful anionic, cationic and non-ionic derivatives, they have broad utility.

The counteranion Z⁻ is a critical factor in the synthesis and stability of these new monomers and polymers. Strong nucleophilic anions such as chloride, thiosulfate, sulfite, or hydroxide react with the salts to cleave the ring. Thus only if Z⁻ is a very weak nucleophile will the 1,3-dioxolenium or 1,3-dioxenium salts have adequate stability. Particularly suitable are the anions of perchloric, chloric, sulfuric, fluorosulfuric, tetrafluoroboric and hexafluoroantimonic acids.

The terms "nucleophile" and "nucleophilic" are used herein as defined and illustrated by Roberts and Caserio "Basic Principles of Organic Chemistry," W. A. Benjamin, Inc., New York, 1965, pp. 287–291. Essentially these terms deflect the ability of a reagent or ionic species to donate an electron pair to carbon.

The new ethylenically unsaturated monomers can be prepared by extension of known methods to the cyclization of readily available $\beta$- or $\gamma$-hydroxy- or alkoxyalkyl acrylic esters of Formula IV:

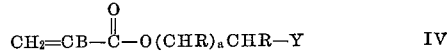

wherein B, R and a are defined as in Formula I and Y is Br, Cl, OH or OR′ where R′ is a $C_1$–$C_4$ alkyl group. The requisite $\beta$- or $\gamma$-substituted alkyl acrylic esters can be prepared, for example, by esterification of an acrylic acid with a 1,3 or 1,3-glycol such as ethylene glycol, propylene glycol and 1,3-butanediol, or with a monoalkyl ether of such a glycol. Reaction of an acrylic acid with ethylene, propylene or other alkylene oxide also yields suitable $\beta$-hydroxyalkyl esters.

Cyclization of these ethylenically unsaturated organic esters (IV) to a 1,3-dioxolenium or 1,3-dioxenium salt can be achieved by the methods of Meerein et al. Thus with a $\beta$- or $\gamma$-haloalkyl ester (IV, Y=Br, Cl) cyclization is readily obtained by reaction with $AgBF_4$ $AgSbF_6$, $AgClO_4$ or $SbCl_5$ in a non-aqueous solvent such as methylene chloride. Alternately, with a hydroxy- or alkoxyalkyl ester (IV, Y=OH or OR′), cyclization can be achieved with sulfuric, fluorosulfuric, or other protonic acid of a weakly nucleophilic anion, e.g. HZ. These cyclizations occur readily at about 0°–50°° C. although higher temperatures can be used at times with the more stable reactants and products. Particularly with the hydroxyalkyl esters formation of the 1,3-dioxolenium and 1,3-dioxenium salts as followed by nuclear magnetic resonance (NMR) is usually rapid at about room temperature.

Specific examples of the new monomers include 2-vinyl-, 2-isopropenyl- and 2-($\alpha$-chlorovinylidene)-1,3-dioxolenium and 1,3-dioxenium salts as well as the corresponding 4-methyl-, 4-propyl- and 4,5-dimethyl derivatives. In most instances, these monomers are crystalline solids that are soluble in polar solvents such as liquid $SO_2$ and acetonitrile as well as sulfuric acid, fluorosulfuric acid and other acids suitable as a cyclization medium. Often these salts are advantageously used without isolation from the acid medium; but when desired they can usually be isolated by precipitation of an insoluble salt such as a perchlorate by dilution of the acid with a suitable liquid precipitant such as ether, n-hexane or toluene.

In the absence of water or other strong nucleophile, the 1,3-dioxolenium and 1,3-dioxenium salts as formed in the acid medium or as an isolated solid are quite stable at room temperature. Also a small amount of water in the acid medium, e.g. up to about 1 mole per mole of acid (HZ), can usually be tolerated. However, larger amounts of water even in the presence of the strong acid lead to rapid hydrolysis and ring cleavage to form a hydroxyalkyl ester.

These 1,3-dioxolenium and 1,3-dioxenium salts react not only with water, but with a wide variety of other nucleophilic reagents including HCl, HBr, LiCl, KSCN, NaI, $Na_2SO_3$ and $Na_2S_2O_3$ as well as $NH_3$ and alkyl amines to form substituted alkyl acrylic esters of known utility. For example, with ammonia or an alkyl amine, aminoalkyl acrylates are formed. With $Na_2SO_3$ sulfoacrylates such as described by Sheetz U.S. Patent 2,923,734 can be prepared. Hence these salts are highly useful synthetic intermediates.

These new salts are also reactive ethylenically unstaurated monomers which can be polymerized or copolymerized with other ethylenically unsaturated monomers by standard techniques. For example, they can be copolymerized with styrene, vinyltoluene, divinylbenzene and other vinylaromatic monomers; with another acrylic monomer such as acrylic acid, methyl methacrylate, or acrylamide; or with other ethylenically unsaturated monomers such as ethylene, 1,3-butadiene, isoprene, vinyl chloride, vinyl acetate, vinylidene chloride, divinyl ether, maleic anhydride, and itaconic acid.

The relative portion of the 2-alkenyl-1,3-dioxolenium or 1,3-dioxenium salt and comonomers can be varied widely depending on the final properties desired. As little as 0.5 weight percent of the 2-alkenyl-1,3-dioxolenium or 1,3-dioxenium salt incorporated in a polymer by copolymerization or grafting provides a useful means for adding a significant number of anionic, cationic or non-ionic groups to the polymer by further reaction of the pendent 1,3-dioxolenium or 1,3-dioxenium salt.

Polymerization of these alkenyl salts can be carried out in mass without added diluents, in solution with a solubilizing liquid diluent, or in suspension or emulsion with a non-solvent liquid diluent. Polymerization is conveniently initiated by the thermal decomposition of a catalytic amount of a conventional free radical catalyst such as azobisisobutylnitrile, lauryl peroxide, benzyl peroxide, or potassium persulfate. The portions of such catalysts ranging from about 0.05 to 5.0 and preferably about 0.2 to 2.0 weight percent based on monomer are advantageously used. Alternately, polymerization can also be initiated by irradiation of the monomer mixture with ultra-violet light or other high energy source.

Polymerization conditions such as the temperature and reaction time will varying depending upon such factors as the monomer, catalyst, and solvent used as well as reactant concentrations. Generally it is preferable to polymerize 2-alkenyl-1,3-dioxolenium or 1,3-dioxenium salt at about 20°–50° C. although higher temperatures may be desirable at times. Below about 20° C. polymerization is often impractically slow while above about 100° C. side reactions may predominate.

Depending upon polymerization conditions, the resulting polymers and copolymers will range from relatively low molecular weight products up to polymers with an average molecular weight of several hundred thousand or more as estimated from viscosity data. Higher molecular weight polymers are normally obtained by polymerization at lower temperatures.

While the exact polymer composition will depend on the specific monomers, ratios and polymerization conditions, analysis of the polymers, copolymers for pendent 1,3-dioxolenium or 1,3-dioxenium groups can be made by infrared, NMR or chemical means. For example, reaction of the 1,3-dioxolenium group with HBr in acetic acid to yield the bromoalkyl ester is quantitative.

Not only can these polymers containing pendent 1,3-dioxolenium or 1,3-dioxenium groups be prepared from the new monomers disclosed herein, but also they can be prepared from other polymers including polyacrylates, linear and cross-linked vinylaromatic polymers, polymethylenediphenyl ether, and other organic polymers containing a pendent ester group of the requisite structure, e.g. a polymer containing groups as shown in Formula V:

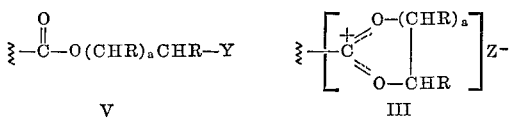

V  III wherein R, and $a$ and Y are defined as in Formula IV. Such polymers can be prepared, for example, by esterification of a substituent carboxyl group attached to a polymer matrix with ethylene glycol, etc. Conversion to a polymer containing groups as shown in Formula III can be achieved as described above for the 1,3-dioxolenium and 1,3-dioxenium monomers. These polymeric salts have a similar facile reactivity toward strong nucleophilic reagents and hence provide a useful alternate method for the synthesis of polymers containing functional groups including non-ionic, anionic and cationic products.

The following examples illustrate further the present invention. Unless otherwise specified, all parts and percentages are by weight.

Example 1.—2-isopropenyl-1,3-dioxolenium tetrafluoroborate

A. To a solution of 1.93 parts (0.01 mole) of 2-bromoethyl methacrylate in 19.8 parts of anhydrous methylene chloride in dry nitrogen atmosphere was added 1.93 parts (0.01 mole) of anhydrous silver tetrafluoroborate. A mild exotherm was observed in the stirred mixture with formation of a clean colored precipitate. After stirring for two hours at 25–30° C., 3.50 parts of precipitated silver bromide and product were recovered. The 1,3-dioxolenium salt was isolated from the silver bromide by extraction with liquid sulfur dioxide. Evaporation of the sulfur dioxide gave a tan-red-brown solid which was purified by washing several times with ether to yield 1.45 parts (81%) of a tan solid M.P. 150–153° C.

A sample of the monomer was recrystallized from acetonitrile-methylene chloride and obtained as a stable, while salt, M.P. 155–156.5° C.

Calcd. for $C_6H_9O_2BF_4$: C, 36.1; H, 4.54. Found: C, 36.2; H, 428. The NMR spectrum of the 2-isopropenyl-1,3-dioxolenium salt in fluorosulfuric acid was consistent with the assigned structure having a split doublet at −7.03 and −6.66 p.p.m. (vinyl proton), a singlet at −5.34 p.p.m. (ring protons) and a singlet at −2.15 p.p.m. (methyl protons) in a ratio of 2:4:3 respectively. The infrared spectrum had strong absorption peaks at 2980–3125 cm.$^{-1}$ (C—H), 1640 cm.$^{-1}$ ($CH_2$=C<), and 930–1200 cm.$^{-1}$

B. The same 2-isopropenyl-1,3-dioxolenium cation was also prepared by cyclization of 2-hydroxyethyl methacrylate with sulfuric or fluorosulfuric acid. Thus to 0.673 parts of 94% $H_2SO_4$ was added 0.131 parts (1.0 mmole) of 2-hydroxyethyl methacrylate. A slight bubbling and exotherm was observed.

Formation of the 1,3-dioxolenium cation was followed by nuclear magnetic resonance (NMR) spectroscopy. Conversion was 72% complete in 1.25 hours and 87% complete in 2 days at room temperature. The NMR spectrum of the product in concentrated sulfuric acid is identical to that of the 2-isopropenyl-1,3-dioxolenium tetrafluoroborate prepared in Example 1A dissolved in $H_2SO_4$.

In another run 0.102 part (0.79 mmole) of 2-hydroxyethyl methacrylate was dissolved in 0.684 part (5.9 mmoles) of fluorosulfonic acid. Cyclization followed by NMR spectra was complete in 0.25 hr.

Example 2.—2-vinyl-1,3-dioxolenium tetrafluoroborate

Following the general process described in Example 1A, 2-vinyl-1,3-dioxolenium tetrafluoroborate was prepared by reaction of a stoichiometric amount of β-bromoethyl acrylate and silver tetrafluoroborate in methylene chloride at room temperature. The 1,3-dioxolenium salt was separated from the coprecipitated AgBr by extraction with liquid $SO_2$. The isolated product recrystallized from acetonitrile-methylene chloride had a M.P. of 151–152.5° C.

Calcd. for $C_5H_7OBF_4$: C, 32.31; H, 3.80. Found: C, 32.5; H, 3.90. The NMR and infrared spectra were consistent with the assigned structure.

Example 3.—poly-2-isopropenyl-1,3-dioxolenium salts

A. About 0.125 part of poly(2-hydroxyethyl methacrylate) was dissolved in 0.61 part fluorosulfuric acid at room temperature and the conversion into the 1,3-dioxolenium cation was followed by NMR. The initial ester had broad peaks at −1.12 p.p.m. characteristics of the α-methyl group, at −2.05 p.p.m. characteristic of the vinyl polymer backbone, and an unresolved $A_2X_2$ pattern at −4.34 and −3.70 p.p.m. typical of the β-hydroxyethyl groups. Treatment with fluorosulfuric acid caused a downfield shift of the peaks signals with the disappearance of the ethyl $A_2X_2$ pattern with concurrent increase in a broad single adsorption at −5.55 p.p.m. as expected for the more symmetrical cation. After two hours no further changes were observed in the spectra.

B. A stoichiometric amount of poly-2-bromoethyl methacrylate and anhydrous silver tetrafluoroborate were mixed in anhydrous methylene chloride and stirred overnight at room temperature. The precipitated silver bromide and poly-2-isopropenyl-1,3-dioxolenium tetrafluoroborate was recovered. It was slurried with fluorosulfuric acid and filtered to remove the insoluble silver bromide. The fluorosulfuric acid filtrate had an NMR spectrum identical to that for the product of Example 2A.

C. A mixture of 200 parts of 2-isopropenyl-1,3-dioxolenium tetrafluoroborate prepared as described in Example 1A and 10 parts of benzoyl peroxide in 3 parts of anhydrous methylene chloride was charged to a Carius tube, flushed with nitrogen and sealed. The sample was irradiated at 18–20° C. for two days with a high intensity sun lamp. Upon opening the Carius tube, the walls were found to be coated with a colorless polymeric film. NMR examination of this polymer dissolved in fluorosulfuric acid indicated that it was essentially identical to the polymer of Example II–A and B.

I claim:

1. A 2-alkenyl-1,3-dioxolenium or 1,3-dioxenium salt of the formula:

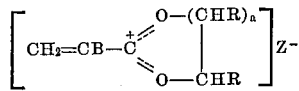

wherein B is H, Cl or a $C_1$–$C_4$ alkyl group,
each R individually is H or a $C_1$–$C_4$ alkyl group,
$a$ is 1 or 2, and Z is an anion selected from the group consisting of perchlorate, chlorate, bisulfate, fluorosulfate, tetrafluoroborate and hexafluoroantimonate.

2. The salt of claim 1 wherein each R is H.
3. The 2-isopropenyl-1,3-dioxolenium salt of claim 1 wherein B is methyl, each R is H and $a$ is 1.
4. 2-isopropenyl-1,3-dioxolenium tetrafluoroborate.
5. 2-vinyl-1,3-dioxolenium tetrafluoroborate.
6. A solid polymer containing at least 0.5 weight percent of 1,3-dioxolenium or 1,3-dioxenium recurring units of the formula:

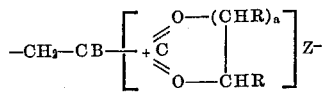

wherein each R individually is H or a $C_1$–$C_4$ alkyl group,
$a$ is 1 or 2,
Z is an anion selected from the group consisting of perchlorate, chlorate, bisulfate, fluorosulfate, tetrafluoroborate and hexafluoroantimonate, and
B is H, Cl or a $C_1$–$C_4$ alkyl group.

7. The polymer of claim 6 wherein R is H.
8. The polymer of claim 6 wherein B is methyl, each R is H, and $a$ is 1.
9. Solid poly-2-isopropenyl-1,3-dioxolenium fluorosulfate.

References Cited

UNITED STATES PATENTS 3,010,945 11/1961 Ikeda _____ 260—340.7
3,055,766 9/1962 Reinhardt _____ 260—340.9

JOSEPH L. SCHOFER, *Primary Examiner.*

D. K. DENENBERG, *Assistant Examiner.*

U.S. Cl. X.R.

260—78.5, 82.1, 80.3, 86.1, 88.1, 87.5, 87.7, 340.7, 340.9